July 14, 1970     J. T. McNANEY     3,520,593
COPLANAR DECODING LIGHT BEAM DEFLECTION APPARATUS
Filed June 21, 1968
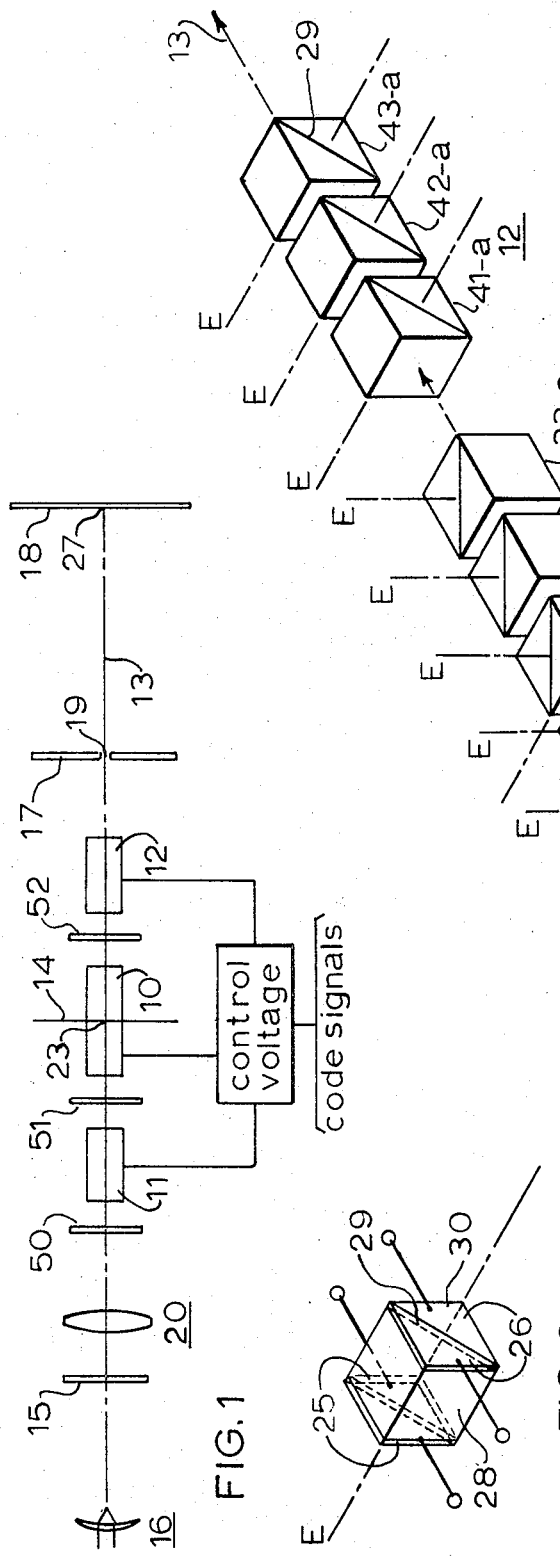
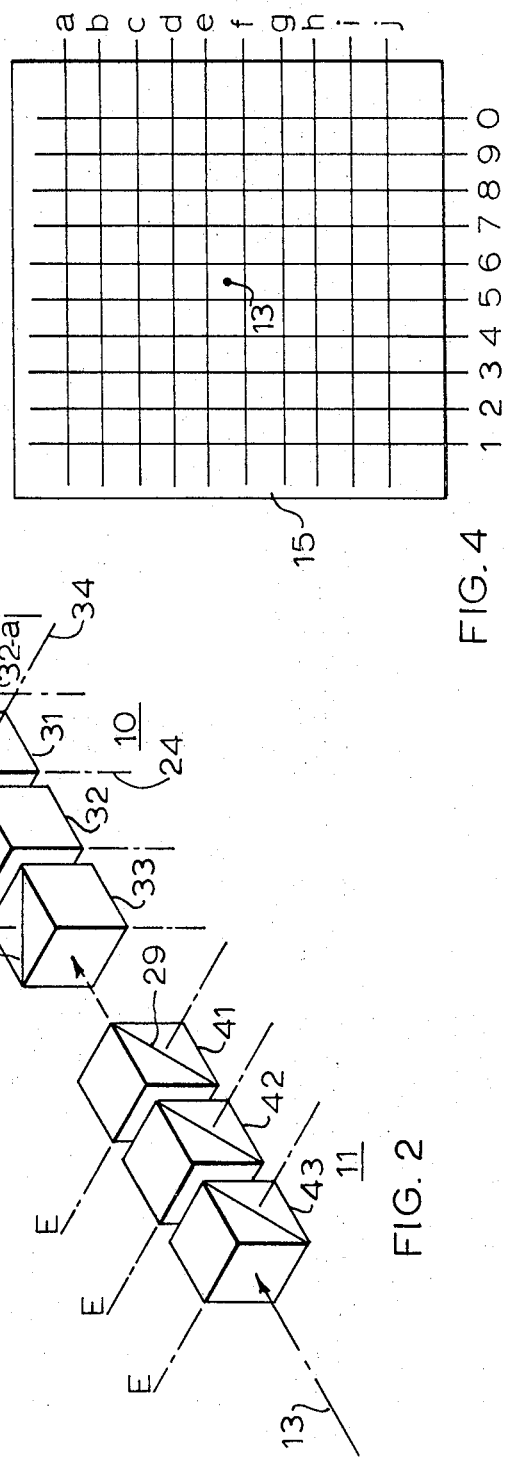
INVENTOR.
Joseph T. McNaney

United States Patent Office 3,520,593
Patented July 14, 1970

3,520,593
COPLANAR DECODING LIGHT BEAM
DEFLECTION APPARATUS
Joseph T. McNaney, 8548 Boulder Drive,
La Mesa, Calif. 92041
Filed June 21, 1968, Ser. No. 739,123
Int. Cl. G02f 1/28
U.S. Cl. 350—160        3 Claims

ABSTRACT OF THE DISCLOSURE

Specified herein is an electro-optical light beam deflection system for effecting deflections, and thereby axial alignments, of individually character shaped light beams converging on and crossing an optical axis of the system from a plurality of off-axis positions. More particularly this deflection system is designed to deflect the beams from their initial convergent paths in relation to a point along the axis which is intersected by a common plane of the system, whereby any one of the beams may be deflected, before having crossed the axis, and directed along the axis. Moreover, this deflection system is designed to effect the direction of beams along the axis in response to coded information in the form of a plurality control voltages applied thereto.

BACKGROUND OF THE INVENTION

This invention relates to light beam deflection apparatus of the type which I disclosed in my U.S. Pat. No. 3,400,992. The present coplanar decoding light beam deflection apparatus, however, utilizes optical prisms of electrically controllable refractive materials systematically disposed along a common axis so as to provide light beam deflection powers which vary with the geometric progression, for example, 1:2:4:8, or wherein $n$ optical units will provide $2^n$ axial alignments of character shaped light beams.

SUMMARY OF THE INVENTION

The coplanar decoding light beam deflection apparatus of this invention controls the deflection of a plurality of character shaped light beams originating, for example, at the plane of a beam forming member containing character shaped windows arranged in a system of Cartesian coordinates, and converging on a common axis of the apparatus toward a point which is intersected by a common beam deflection plane of the system. An important object of this invention is to effect deflections of such an array of character shaped light beams in relation to the common plane referred to herein so as to direct, in a selective manner, any one of the plurality of beams along the common axis of the system. Moreover, a further object of this invention is to relate the arrangement of the windows in the beam forming means with the systematic disposition of the controllable prisms along the axis, and also with coded information used to select and direct predetermined ones of the light beams along the common axis.

The invention itself, both as to its originality and method of operation, and additional objects and advantages, will best be understood from the following description when read with the accompanying drawing.

BRIEF DESCRIPTION OF THE DRAWING

FIG. 1 is a schematic drawing of a system embodiment of the invention;

FIG. 2 represents a diagram and schematic perspective view of a light deflection system embodying the invention;

FIG. 3 shows a single prism assembly of the systems in FIGS. 1 and 2; and

FIG. 4 represents a window arrangement in the beam forming member.

DESCRIPTION OF THE PREFERRED EMBODIMENTS

In a system embodiment of the invention shown in FIG. 1, electro-optic light beam deflection control means, including a first light beam deflection system 10 and a second light beam deflection system 11 and 12, is positioned along an optical axis 13 and in relation to a common beam deflection plane 14. A beam forming member 15 is also positioned along this axis intermediate the unit 11 and a source of light 16, and a light beam mask 17, intermediate the unit 12 and a target 18, also has a beam selecting window 19 which is positioned along the axis 13. Light from a source 16, therefore, will flood an array of beam forming windows in the member 15 and the required means, such as a lens system 20, will direct an array of character shaped light beams from the member 15 to a beam cross-over point along the axis 13 coincident with the deflection plane 14. A diagram of the preferred beam deflection systems 10, 11 and 12 are again shown in FIG. 2, and a detailed showing of the beam forming member 15 is again presented in FIG. 4.

Referring now to FIG. 2, the first light beam deflection system is exemplified, and will be described, as being a single unit 10 of a plurality of first and second optical prisms, and the second light beam deflection system is exemplified, and will be described, as being a first unit 11 and a second unit 12, each having a plurality of first and second optical prisms. Additionally, each of the optical prism pairs will be described as having electrode means, as illustrated in FIG. 3, to which a voltage may be connected in the process of modifying an otherwise normal index of refraction of opposing prisms. For example, each prism of electrically controllable refractive material will have a pair of electrodes 25 and 26 on opposite side faces thereof, and preferably deposited thereon so that the potential influence applied across one prism of each pair can be applied independent of a potential influence applied across the other prism of each pair. However, the invention is not to be limited in this regard since the electrode requirements and means of applying the influence of an electrical potential across the deflection systems of this invention will depend upon the electro-optic material of the prisms and which, of course, may be either electro-optic or magneto-optic prisms.

In FIG. 2 the unit 10 of the first deflection is exemplified as consisting of five prism pairs, and each of the units 11 and 12 of the second deflection system is exemplified as consisting of three prism pairs. Although not shown, each of the prism pairs will be provided with electrode means on opposite side faces thereof as exemplified in FIG. 3. The preferred direction for applying the influence of an electrical potential, therefore, will be along an optic axis, identified as E, of each of the prisms in the two systems, and which axes are perpendicular to the optical axis 13. The common plane 14 of the beam deflection control means coincides with a common beam deflection plane 24 of the unit 10 of the first deflection system and also with a common beam deflection plane 34 of the units 11 and 12 of the second deflection system. When one or more adjoining prisms 28 and 30 of the unit 10 are subjected to the influence of an electrical potential the deflection of a plurality of beams converging on a point 23 will be deflected about the point 23, and also when the influence of an electrical potenital is applied to the units 11 and 12 these beams will be deflected about the point 23. Such deflections will therefore occur about the common plane 14 of the entire control means, but such deflections will in fact be a combination of minor beam deflections occurring at the adjoining surfaces 29 of the prism pairs, and these minor deflections are related to a set of code signals to the input of the overall system and the placement of corresponding shaped windows in the beam forming member 15. In view of this the overall beam deflection effects will be referred to as coplanar light beam deflections.

A window arrangement in the beam forming member 15, as exemplified in FIG. 4, includes 100 points at which individual character shaped windows, such as letters, numerals, symbols, etc., may be positioned, and these placement points will be related to a particular set of code signals, and the light beam deflection power of the various prism pairs will also be related to the code signals. If, for example, there is a beam forming window at each of the 100 positions in the member 15, character shaped beams from these windows will converge on, and cross, the axis 13 at the point 23 along the axis. After crossing the axis the windows of the member 15 will then be imaged on the mask 17, for example, and further travel of the beams will be blocked by the mask 17, since the mask window 19 is precisely on the axis 13 and windows nearest the axis 13 at the window 19 will be those windows in the member 15 at line intersections 5–e, 5–f, 6–e and 6–f. The windows in the member 15 furthest from the axis 13 will be those at line intersections 1–a, 1–j, 0–a and 0–j. In order to align each of beams from these windows, as well as beams from the remaining windows, with the axis 13 selectively, and in the manner necessary to have each selected beam enter the window 19 and register precisely at a point 27 adjacent a target 18, the index of refraction of the adjoining prism pairs of the units 10, 11 and 12 will be established accordingly.

The beam deflection power of each two adjoining prisms will be predetermined and their respective power will be established upon the application of the influence of a predetermined voltage along the optical axis E. And in each case such influence is applied in response to coded input commands whereby equal indices of refraction of adjoining prisms are changed to predetermined unequal indices of refraction. To explain more fully, the first prism of each pair in the overall system to receive the array of light beams will be referred to as prism–1, and the second prism adjoined thereto will be referred to as prism–2. When the index of refraction of a prism–1 presents a lower index than prism–2 the beams converging on the axis 13 will be deflected in one direction in relation to point 23, and when the index of refraction of prism–2 is lower than that of prism–1 these beams will be deflected in an opposite direction.

In relating the various prism pairs of the systems to the window placements in the member 15, the five prism pairs shown in the unit 10 will be referred to as prisms 31, 32 and 32a, and 33 and 33a, and the six prism pairs shown in the units 11 and 12 will be referred to as prisms 41 and 41a, 42 and 42a, and 43 and 43a. And, for example, the unit 10 will be referred to as a horizontal beam deflection system, and the units 11 and 12 will be referred to as a vertical beam deflection system. The member 15, as shown in FIG. 4, will be viewed as being positioned along the axis 13 and character shaped beams therefrom will be understood as traveling into the paper and crossing the axis 13 at the common plane 14 and toward the mask 17. The direction of individual beams along the axis 13, so that they will register on a common point 27 at the target 18 upon entering the selection window 19, will be the result of a combination of horizontal and vertical beam deflections about the crossover point 23. Each prism pair is related to predetermined line crossings in FIG. 4, and upon the application of a potential influence thereto each prism pair will perform a predetermined beam deflection function. Prisms 31 are related to the crossings along lines 5 and 6; prisms 32 and 32a are related to the crossings along lines 4 and 7; prisms 31 in combination with prisms 32 and 32a are related to the crossings along lines 3 and 8; prisms 32 and 32a combined with prisms 33 and 33a are related to crossings along lines 2 and 9; prisms 31, 32 and 32a and 33 and 33a are related to crossings along lines 1 and 0. Prisms 41 and 41a are related to crossings along lines e and f; prisms 42 and 42a are related to crossings along lines e and f; prisms 42 and 42a are related to crossings along lines d and g; prisms 41 and 41a, 42 and 42a are related to crossings along lines c and h; prisms 42 and 42a, 43 and 43a are related to crossings along lines b and i; and prisms 41 and 41a, 42 and 42a and 43 and 43a are related to crossings along lines a and j. Depending upon which combination of prisms are being subjected to a potential influence, the character shaped beam being directed along the axis 13 will originate from a position in the member 15 that is related to the particular prisms receiving such influence.

In response to code signals, binary code for example, individual elements thereof will be used to control simultaneously the prisms on opposite sides of the common plane 14, such as prisms 33 and 33a, 32 and 32a, 43 and 43a, 42 and 42a, and so on. Prisms on opposite sides of the plane 14 responding to the one code element, therefore, function as a common deflector in effecting a predetermined beam deflection. A first portion of a total beam deflection in response to one code element is effected before the plane 14 and the second portion is effected after the plane 14, resulting in a total beam deflection about the common plane 14 and cross over point 23. Such deflection control for effecting coplanar beam deflection, both horizontally and vertically, permits any of the beams from the 100 different positions in the member 15 to be aligned with the axis 13. In response to the code signals the beam deflections can be made to vary geometrically and thereby providing digital beam deflections in apparatus utilizing the efficiencies of bending light beams by refraction.

The optical prisms of this invention may be composed of such materials as barium titanate, cuprous chloride, potassium dihydrogen phosphate, deuterated isomorph potassium dideuterium phosphate, yttrium-iron-garnet crystalline material, or other similar materials. Depending upon the particular composition of the prism materials and assembly requirements the operating efficiencies of the overall system can be enhanced through the use of light polarization means, such as the positioning of half wave plates 50, 51 and 52, respectively, along the axis 13 ahead of units 11, 10 and 12, as illustrated in FIG. 1.

Experiments have shown that a member 15 containing a 10 x 10 array of character forming windows can be made quite small. However, satisfactory results have been obtained utilizing approximately 0.003" windows on 0.005" center-to-center spacings, which provides an array of 100 such windows within an area of 0.050" x 0.050". These dimensions, in combination with other reasonable system parameters and the utilization of prism materials presently available, providing beam deflection power of several seconds to several minutes, are very desirable. However, if windows having larger dimensions are necessary to require orders of deflection power exceeding that of a given prism pair, it should be understood that the invention is not to be limited in this regard. For example, each of the prisms 31, 32, 33, etc., are not to be limited to the use of a single adjoining pair. If higher orders of deflection per prism is required, then each may be increased in number to include three, four, or more adjoining prisms at each code element related position.

The target 18 may be in the form of a viewing screen, a stationary record medium, movable film, or other light responsive means, and intermediate the target 18 and the mask 17 additional optical means will be included for effecting proper imaging and deflection of the characteshaped light beams at the surface of the target 18, so as to provide lines or other arrays of images on the target. The light source 16 is symbolic and therefore may be an incandescent, arc, laser, or some other type source which meets the requirement of the system and application. Although not shown, means for blanking and unblanking the light beam being exposed to the target will be included, if required.

Although I have limited myself to the showing of certain embodiments of the invention, it should be understood by those skilled in the arts that the invention is not to be limited in this regard since many other embodiments embracing the general principles and constructions hereinbefore set forth may be utilized, and still be within the ambit of the present invention.

The particular embodiments of the invention illustrated and described herein is illustrative only, and the invention includes such other modifications and equivalents as may readily appear to those skilled in the arts, and within the scope of the appended claims.

I claim:

1. Electro-optic light beam deflection control means, positioned about a point on an optical axis thereof on which light beams converge from a plurality of directions on opposing sides of said axis, the improvement comprising:

(a) a first light beam deflection system positioned along said axis including one unit of a plurality of first and second optical prisms, each prism including an electrically controllable refractive material and means for subjecting said prisms to the influence of and electrical potential, for effecting deflections of said beams in relation to said point and directing said beams selectively along said axis corresponding to a predetermined set of code signals;

(b) a second light beam deflection system positioned along said axis including first and second units, each having a plurality of first and second optical prisms wherein each prism includes an electrically controllable refractive material and means for subjecting said prisms to the influence of an electrical potential, for effecting deflections of said beams in relation to said point and directing said beams selectively along said axis corresponding to a predetermined set of code signals;

(c) said one unit of the first system being positioned along said axis intermediate said first and second units of the second system, said first and second prisms of said one unit being supported side-by-side so as to provide a multiple array of adjoining surfaces of said prisms which intersect said beams in an area about said point;

(d) said first and second prisms of said first unit of the second system being supported side-by-side so as to provide a multiple array of adjoining surfaces of said prisms which intersect said beams before entering said prisms of said one unit;

(e) said first and second prisms of said second unit of the second system being supported side-by-side so as to provide a multiple array of adjoining surfaces of said prisms which intersect said beams after leaving said prisms of said one unit;

(f) a beam forming means having windows therein for forming said beams so as to represent predetermined characters, said windows being arranged in said beam forming means in conformance with said set of code signals; and (g) means for subjecting said prisms of said first and second systems to said influence for establishing a lower index of refraction in predetermined ones of said first and second prisms of each unit in relation to the index of refraction of the other of said first and second prisms of said units which corresponds to a selected signal from said set of code signals, and for directing a light beam along said axis, in the process of said effecting deflections of said beams in relation to said point, from a position in said beam forming means which corresponds to said selected signal.

2. The invention as set forth in claim 1 additionally including:

(h) a target; and (i) a mask intermediate said second unit of the second system and said target with window means for limiting the passage of light to said target to said light beam being directed along said axis.

3. Electro-optic light beam deflection control means, positioned about a point on an optical axis thereof on which light beams converge from a plurality of directions on opposing sides of said axis, the improvement comprising:

(a) a first light beam deflection system positioned along said axis including one unit of a plurality of individual light beam deflector means, each said deflector means including an electrically controllable refractive material, and means for subjecting said deflection system to the influence of an electrical potential for effecting deflections of said beams in relation to said point and directing said beams selectively along said axis corresponding to a predetermined set of code signals;

(b) a second light beam deflection system positioned along said axis including first and second units, each having a plurality of light beam deflector means and each said deflector means including an electrically controllable refractive material, and means for subjecting said second deflection system to the inflence of an electrical potential for effecting deflections of said beams in relation to said point and directing said beams selectively along said axis corresponding to a predetermined set of code signals;

(c) said one unit of the first system being positioned along said axis intermediate said first and second units of the second system and adjacent said point on the optical axis;

(d) said first unit of the second system being positioned along said axis so as to intercept said beams before entering said one unit of the first system;

(e) said second unit of the second system being positioned along said axis so as to intercept said beams after leaving said one unit of the first system;

(f) a beam forming means having windows therein for forming said beams so as to represent predetermined characters, said windows being arranged in said beam forming means in conformance with said set of code signals; and (g) means for subjecting said light beam deflector means of said first and second systems to said influence for controlling the index of refraction of the refractive material thereof corresponding to a selected signal from said set of code signals and for directing a light beam along said axis, in the process of said effecting deflections of said beams in relation to said point, from a position in said beam forming means which corresponds to said selected signal.

References Cited

UNITED STATES PATENTS

| 3,290,619 | 12/1966 | Geusic et al. |
| Re. 26,170 | 3/1967 | Harris. |
| 3,329,474 | 7/1967 | Harris et al. |
| 3,391,970 | 7/1968 | Sincerbox. |
| 3,391,972 | 7/1968 | Harris et al. |
| 3,400,992 | 9/1968 | McNaney. |
| 3,410,624 | 11/1968 | Schmidt. |
| 3,435,447 | 3/1969 | Duda et al. |

RONALD L. WIBERT, Primary Examiner

EDWARD BAUER, Assistant Examiner

U.S. Cl. X.R.

350—150